(12) United States Patent
Take et al.

(10) Patent No.: US 6,370,377 B1
(45) Date of Patent: Apr. 9, 2002

(54) MOBILE RADIO COMMUNICATION SYSTEM

(75) Inventors: Keijiro Take; Shuuji Itou; Toshiaki Tomisawa, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/274,308

(22) Filed: Mar. 23, 1999

(30) Foreign Application Priority Data

Aug. 26, 1998 (JP) .......................................... 10-239721

(51) Int. Cl.$^7$ .............................. H04Q 7/36; H04Q 7/20
(52) U.S. Cl. ...................... 455/432; 455/456; 455/11.1; 455/15; 455/16; 455/561; 455/562; 455/435; 455/436; 455/445
(58) Field of Search ................................. 455/456, 432, 455/434, 435, 561, 562, 11.1, 15, 16, 436, 437, 438, 550, 552, 31.2, 31.3, 445

(56) References Cited

U.S. PATENT DOCUMENTS 5,239,678 A * 8/1993 Grube et al. ................. 455/511
5,355,511 A * 10/1994 Hatano et al. .............. 455/11.1

FOREIGN PATENT DOCUMENTS

| GB | 2317786 | 4/1998 |
|----|---------|--------|
| JP | 7-87011 | 3/1995 |
| JP | 8-191266 | 7/1996 |
| JP | 9-148981 | 6/1997 |
| JP | 9-247187 | 9/1997 |

* cited by examiner

Primary Examiner—William Trost
Assistant Examiner—Keith Ferguson
(74) Attorney, Agent, or Firm—Rothwell, Figg, Ernst & Manbeck (57) ABSTRACT

A mobile radio communication system which does not need an omnidirectional channel for both a base station and a mobile station to track each other and uses only a narrow beam channel and can reduce a tracking time than before for an adjacent base station and a mobile station to search each other while a visiting area base station and the mobile station are communicating in the overlapped area. The base station and the mobile station comprise a unit for transmitting and receiving in forward or reverse channel, in different frequency, in different tracking channel using a narrow beam. Both the mobile station and the visiting area base station search the location each other, and after searched, they assign the frequency and the beam used in the tracking channel. At the same time, by comprising a searching slot in an information channel to search an adjacent base station while communicating with the visiting area base station, a tracking of other adjacent base station can be performed.

5 Claims, 13 Drawing Sheets

1 0 1 : Mobile Station
1 0 2 : Base Station

101: Mobile Station
102: Base Station

PRIOR ART

Fig. 13

PRIOR ART

MOBILE RADIO COMMUNICATION SYSTEM

BACKGROUND OF THE INVENTION

1. Field of the Invention

The present invention relates to, in a mobile radio communication system in which a base station and a mobile station under control of the base station have a tracking channel for tracking each other by a narrow beam, a tracking method between the mobile station and the base station (namely, a visiting area base station as it controls an area which the mobile station moves around), and a method of searching an adjacent base station while the mobile station communicates with the visiting area base station.

2. Description of Related Art

Figure 11:
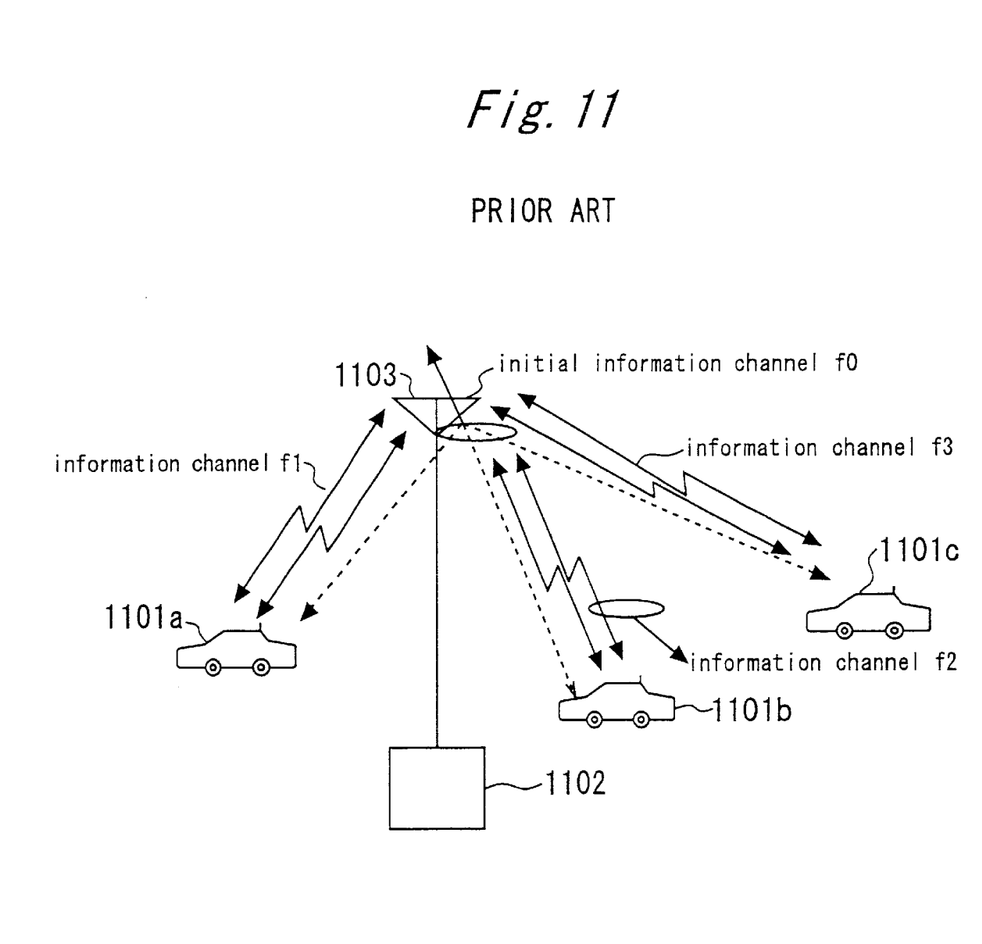
FIG. 11 is a conventional configuration diagram of a control system using a narrow beam.

FIG. 11 illustrates a configuration of a conventional "mobile radio communication system" described in Japanese Patent Application Laid-open No. Hei8-8814. In FIG. 11, reference numerals 1101a, 1101b and 1101c denote mobile stations; 1102 a base station; and 1103 an antenna of the base station 1102.

Figure 12:
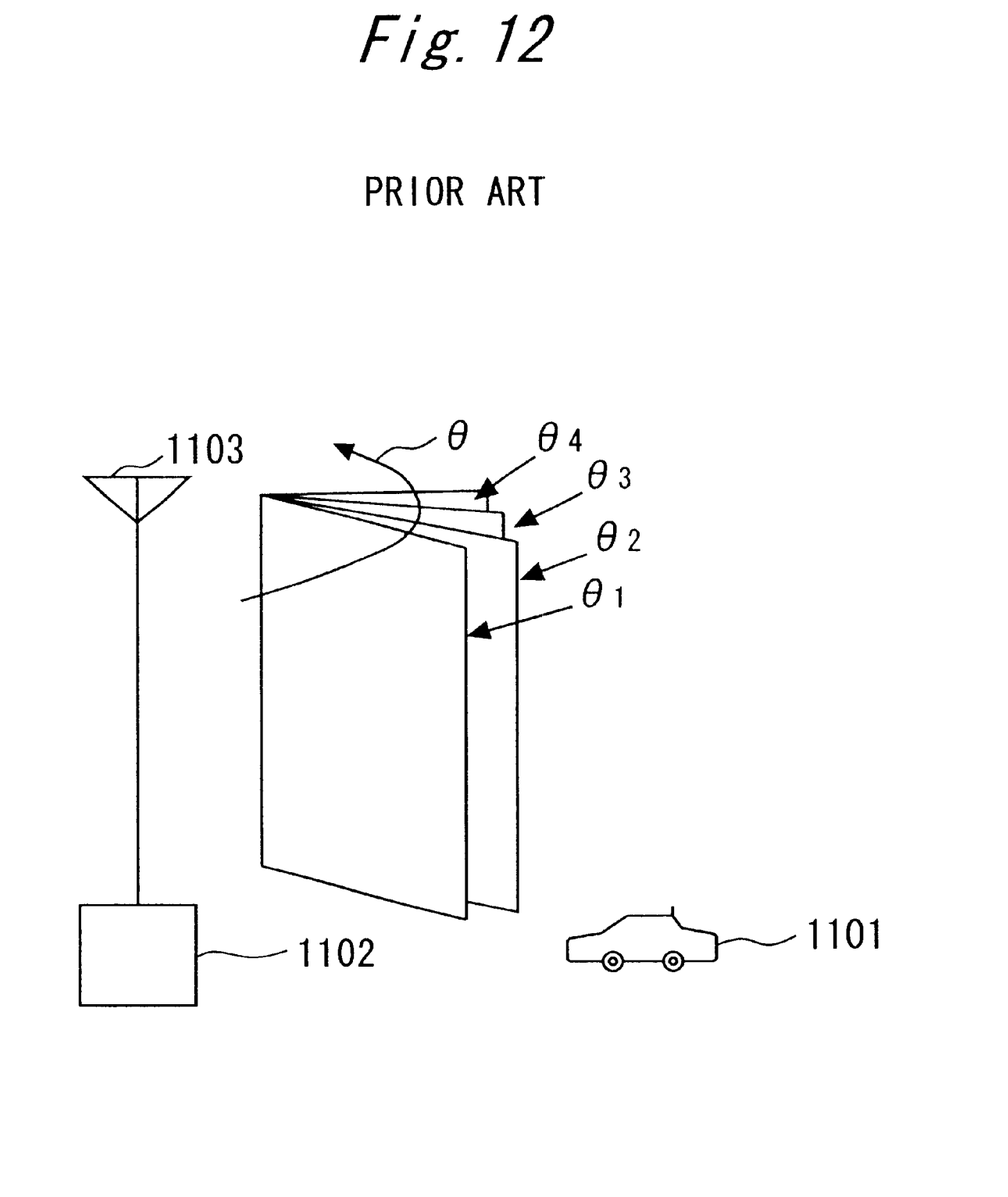
FIG. 12 is a conventional transmitting control of a narrow beam in the direction of a bearing angle in a base station.
Figure 13:
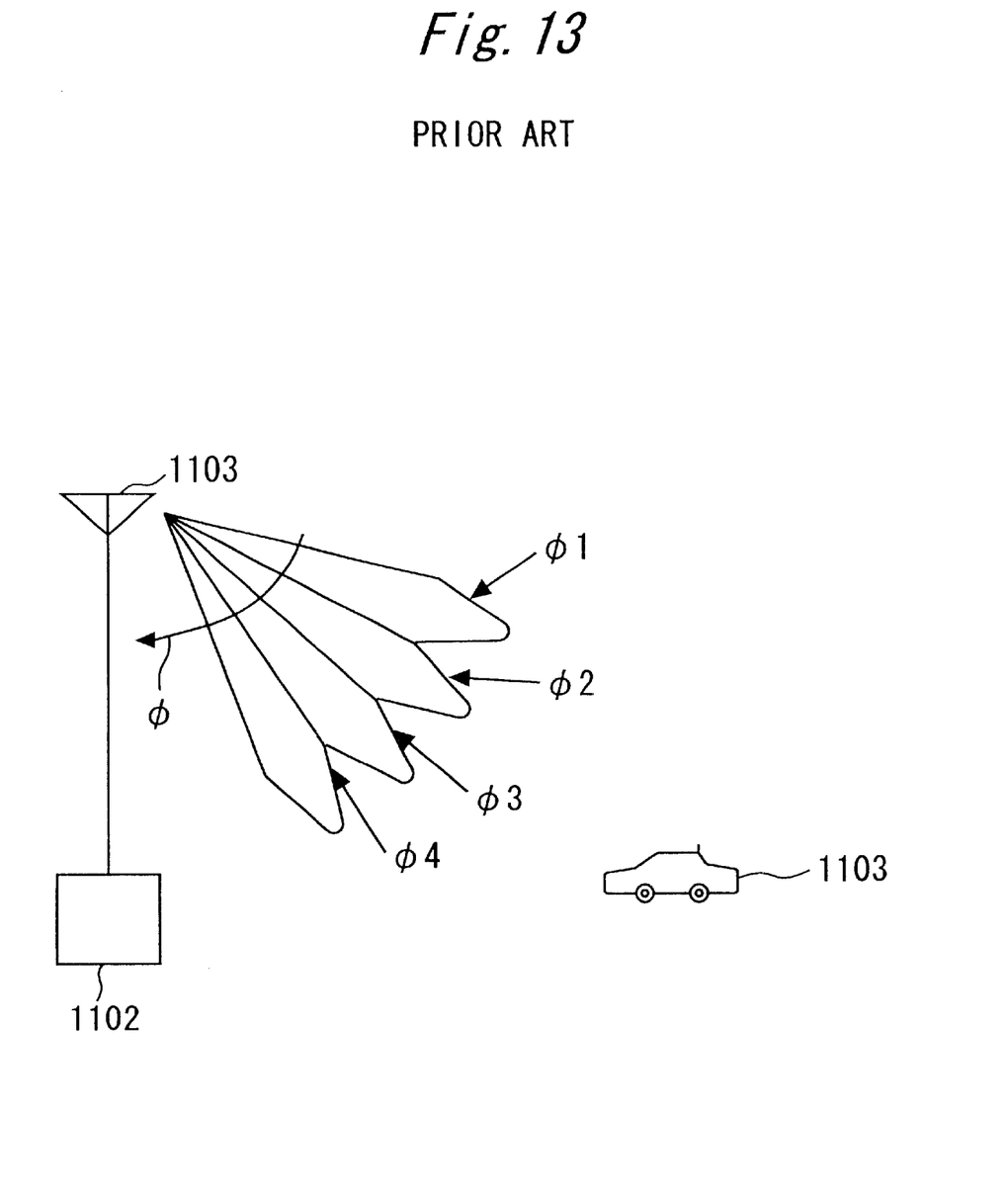
FIG. 13 is a conventional control of a narrow beam in the direction of a depression angle in a base station.

Next, the operation will be explained. In FIG. 11, different frequency channels are assigned to each mobile station. For example, an information channel f1, f2 and f3 are assigned to a mobile station 1101a, 1101b and 1101c, respectively. The mobile radio communication system further comprises a frequency channel f0 common to the base station for transmitting a beam direction information of antenna directivity. As shown in FIG. 12, the base station 1102 controls a transmitting direction omnidirectionally varying a bearing angle θ horizontally as θ1, θ2 and θ3. At the same time, as shown in FIG. 13, the base station 1102 controls a transmitting direction omnidirectionally varying a depression angle φ vertically as φ1, φ2 and φ3.

The mobile station 1101a or the like measures the above bearing angle and depression angle information as well as their receiving levels at any time. The mobile station 1101a or the like identifies a direction of a maximum measured receiving level as a direction of the base station, and transmits again an optimal bearing angle, an optimal depression angle, the receiving level of the optimal bearing angle and the receiving level of the optimal depression angle.

The base station 1102 determines a transmitting level based on the receiving level of the optimal bearing angle and the receiving level of the optimal depression angle transmitted from the above mobile station 1101a or the like, and controls the transmitting level to prevent interference among the base station 1102 and other base stations.

But, when the mobile station approaches to a boundary between the base station 1102 and an adjacent base station, there is a problem in that it is becoming difficult for the mobile station to select a beam from the base station because of a interference wave coming from a plurality of the adjacent base stations.

In "A radio communication system" described in Japanese Patent Application Laid-open No. Hei5-276084, a mobile radio communication system employing a directive antenna and a phased array antenna in a mobile station and a base station is shown, and further, two methods are described as a method of irradiating an omnidirectional pattern to start speech, one of the two methods is a method of providing a connection specific phased array antenna, and the other method is a method of adjusting a phase shifter of the array itself appropriately.

When one of the station performs a omnidirectional irradiation and the other station detects the irradiation in the above method, the other station performs a directive irradiation in the direction of the detected direction and then modifies a transmitting direction of a directive antenna at any time based on an information of a phase value and an amplitude value received by the phased array antenna. Further, a method is described that the above method enables a channel switching when the mobile station moves across the area of the other base station.

But, the above method always needs the omnidirectional irradiation, and needs to comprise both irradiation systems including the omnidirectional irradiation and the narrow beam irradiation.

As mentioned above, in conventional mobile radio communication system, when the mobile station approaches to a boundary between the base station and an adjacent base station, there is a problem in that it is becoming difficult for the mobile station to select a beam from the base station because of a interference wave coming from a plurality of the adjacent base stations.

In another conventional mobile radio communication system, there is a problem in that both of the omnidirectional channel and the narrow beam channel are needed to start a speech.

Further, in an overlapped area in which a mobile station can communicates with a plurality of base stations, both of an adjacent base station which may be handovered and a mobile station need a tracking channel different from the above channel. In the overlapped area, there is a problem in that the adjacent base station and the mobile station set the tracking channels of different frequency and different beam to avoid the interference and track each other, resulting in increasing tracking time.

SUMMARY OF THE INVENTION

The object of the present invention is to solve the above problems, and to provide a mobile radio communication system which does not need an omnidirectional channel for both a base station and a mobile station to track each other and uses only a narrow beam channel. Another object of the present invention is to provide a mobile radio communication system which reduces a tracking time than before for an adjacent base station and a mobile station to search each other while a visiting base station and the mobile station are communicating in the overlapped area.

According to a first aspect of the present invention, there is provided a mobile communication system comprising an mobile station; at least one base station including an visiting area base station which controls an area in which the base station visits; and a tracking channel being used by both the mobile station and the at least one base station for tracking each other using a narrow beam, wherein a transmitting side of the base station has a control means for controlling a direction of a transmitting beam, and a receiving side of the mobile station has a control means for varying a receiving direction.

According to a second aspect of the present invention, there is provided a mobile communication system, comprising: an mobile station; an visiting area base station controlling an area in which the base station visits; an adjacent base station being adjacent to the visiting area base station; and a base station control unit controlling the visiting area base station and the adjacent base station, wherein the mobile station receives a tracking channel by a searching slot during the visiting area base station and the mobile station are communicating each other using an information channel, where the tracking channel includes a base station identifier transmitted from the adjacent base station, the mobile station transmits a mobile station identifier and a control information including a location information and the base station identifier of the adjacent base station obtained from the tracking channel to the visiting area base station, and the visiting area base station transmits the control information to the adjacent base station via the base station control unit.

The above and other objects, effects, features and advantages of the present invention will become more apparent from the following description of the embodiments thereof taken in conjunction with the accompanying drawings.

DETAILED DESCRIPTION OF THE PREFERRED EMBODIMENTS

The embodiments of the present invention will be described below with reference to the accompanying drawings. It is noted that the same reference symbols in the drawings denote the same or corresponding components.

EMBODIMENT 1

Figure 1:
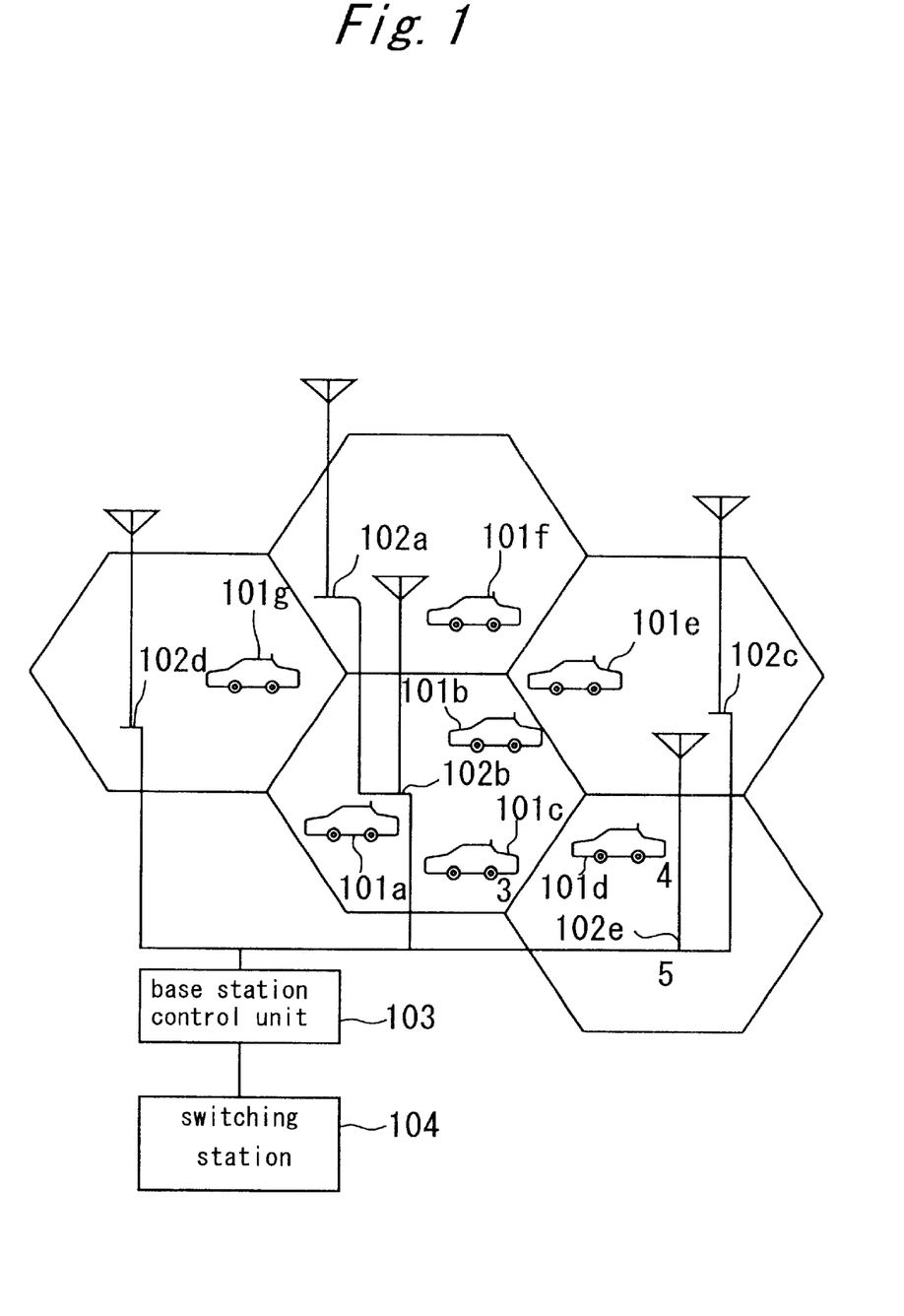
FIG. 1 is a configuration diagram of the present mobile radio communication system.

FIG. 1 shows a configuration diagram of the present mobile radio communication system. In FIG. 1, reference numerals 101a–101g denote mobile stations; 102a–102e base stations include the mobile stations 101a or the like and connect the mobile stations 101a or the like by radio wave; 103 a base station control unit controls the base stations 102 or the like; and 104 a switching station being connected with the base station control unit 103 by wire.

Figure 2:
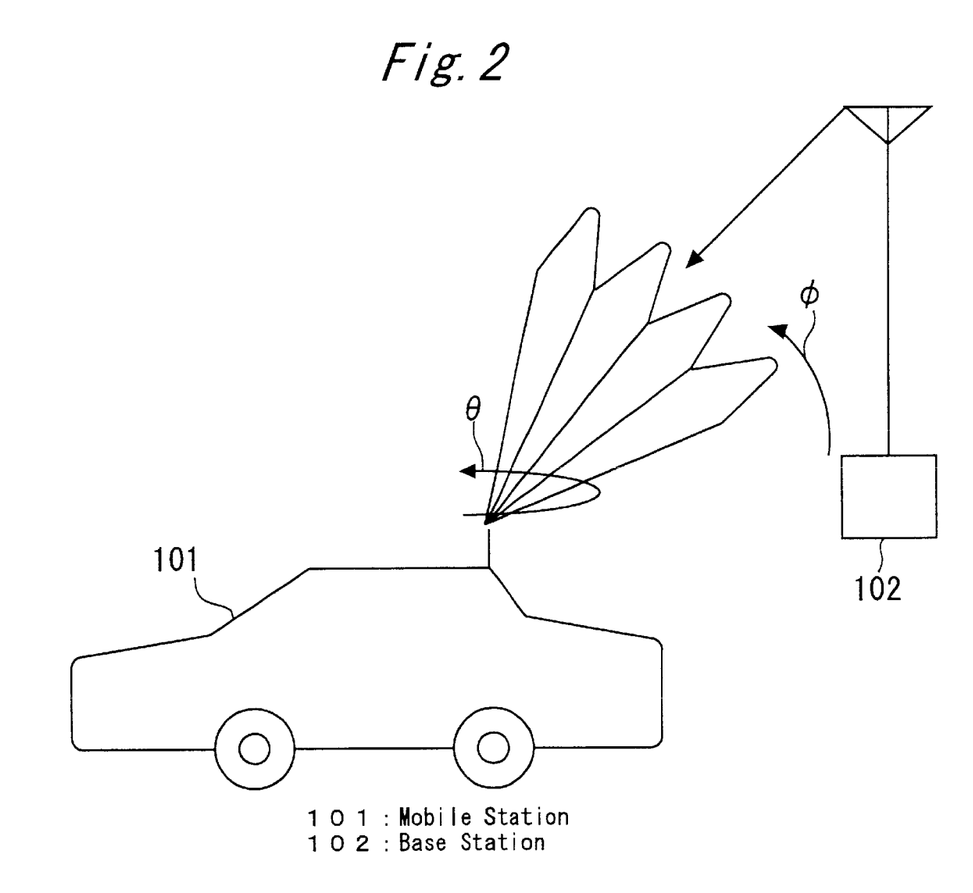
FIG. 2 is a conceptual diagram showing an example of controlling a direction of a receiving angle in a mobile station.
Figure 3:
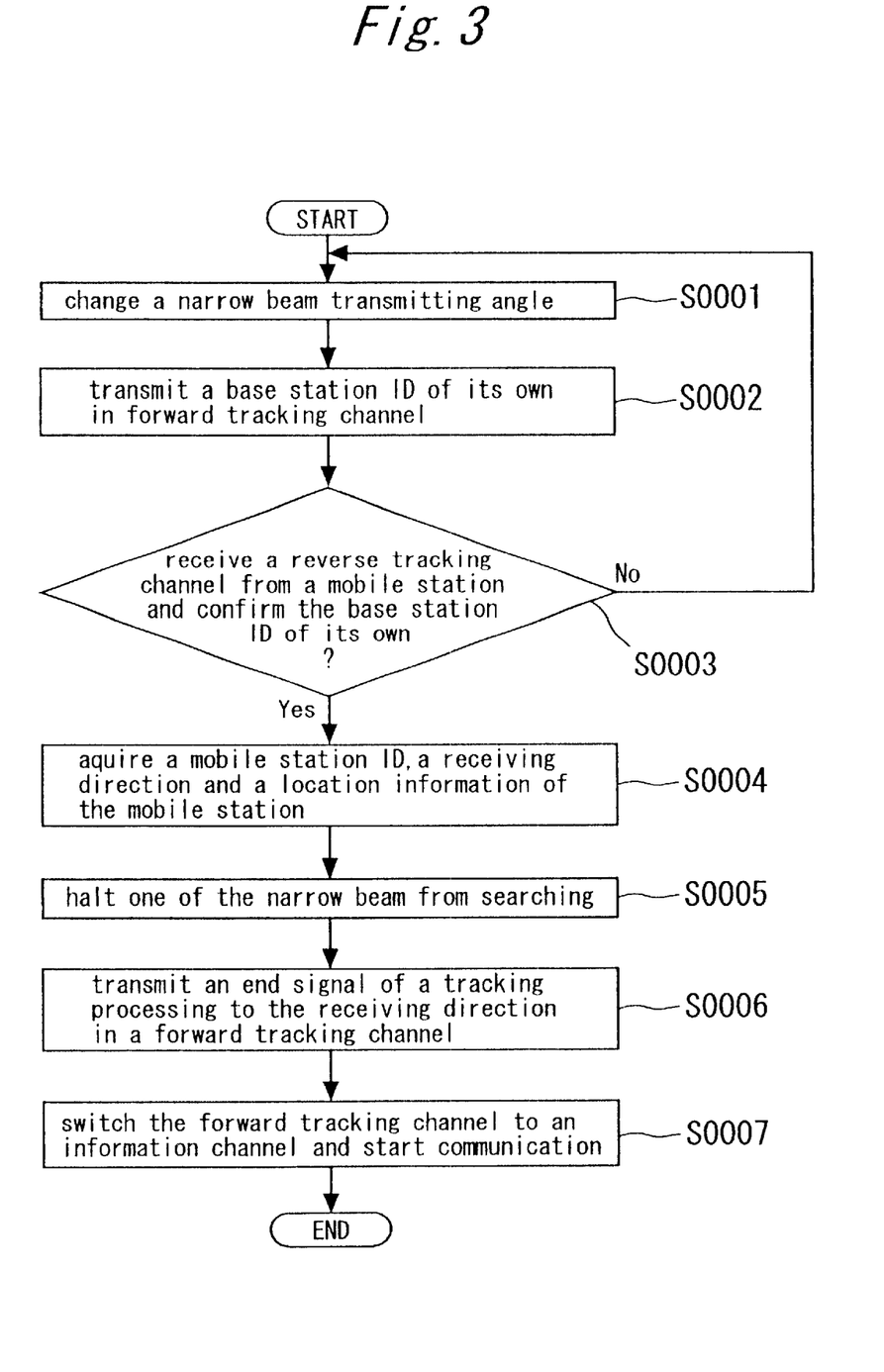
FIG. 3 is a flowchart showing a flow from a tracking processing to a starting of a communication in a base station.
Figure 4:
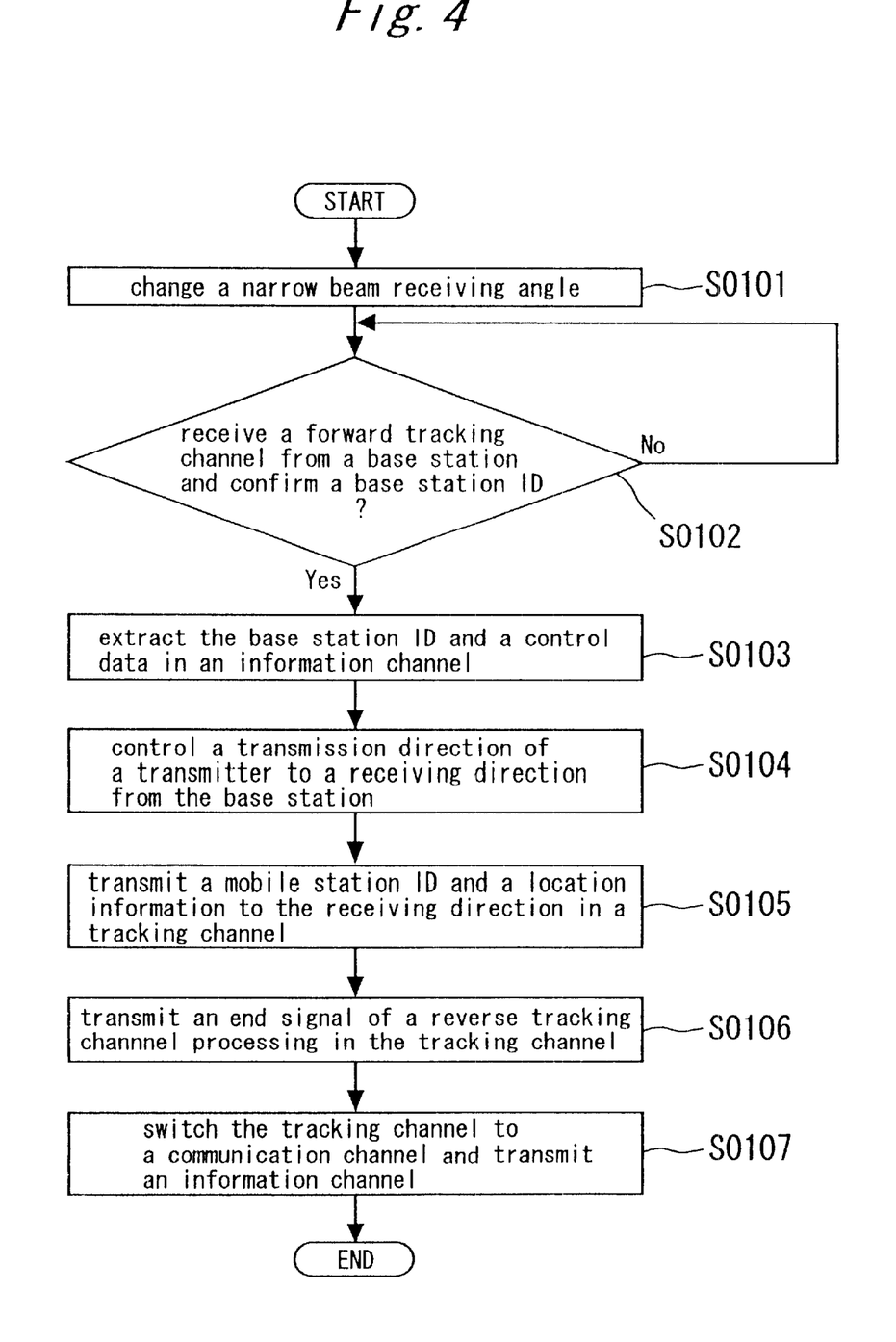
FIG. 4 is a flowchart showing a flow from a tracking processing to a transmitting in a mobile station.
Figure 5:
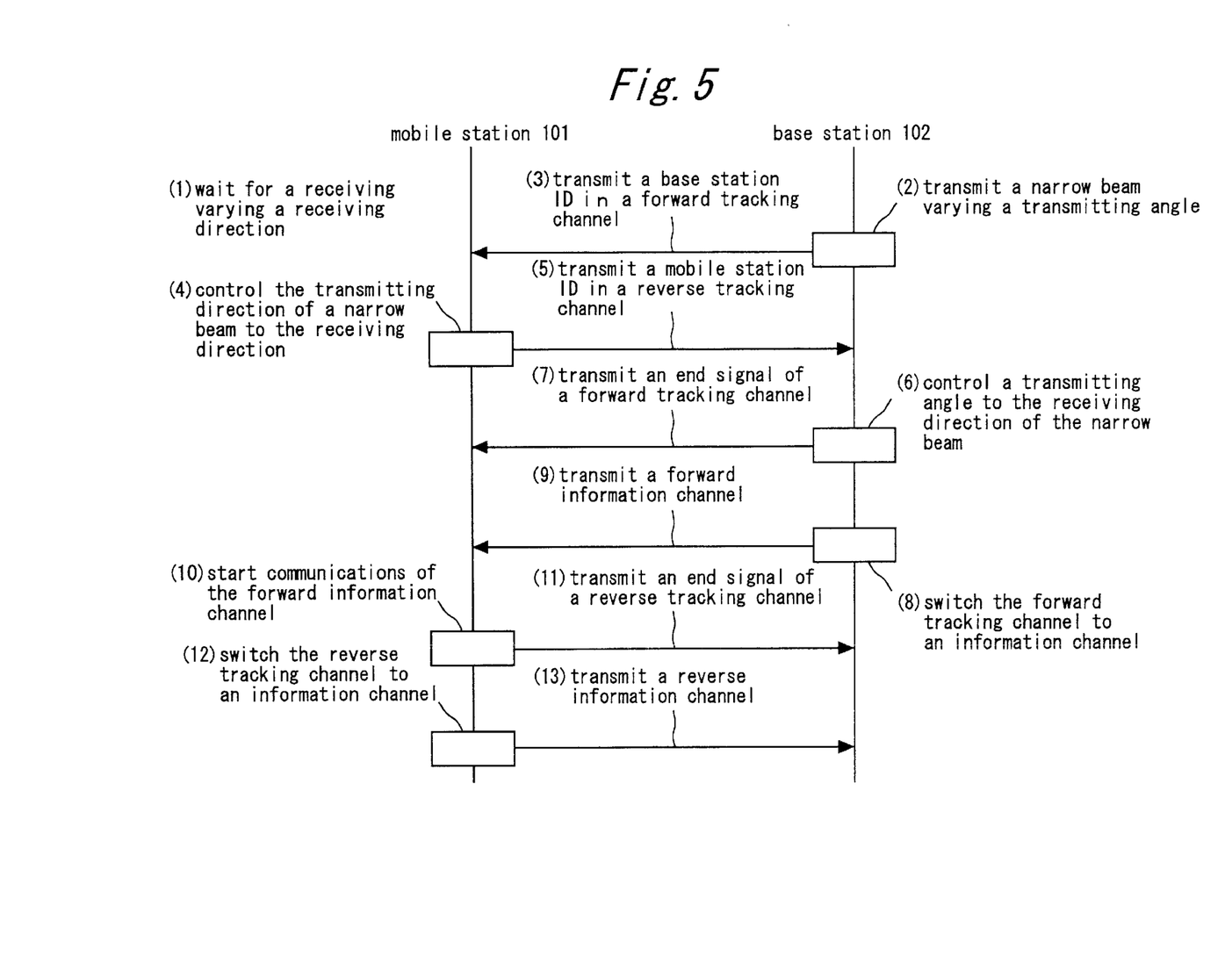
FIG. 5 is a sequence diagram showing a sequence from a tracking processing to a communicating state between a mobile station and a base station.

Next, the operation will be explained. FIG. 2 shows conceptually an example of a control in the direction of a receiving angle. In FIG. 2, the same reference numerals denote the same or corresponding parts. FIG. 3 is a flowchart showing a flow from a tracking processing to a starting of a communication in a base station. FIG. 4 is a flowchart showing a flow from a tracking processing to a transmitting in a mobile station. FIG. 5 is a sequence diagram showing a sequence from a tracking processing to a communicating state between a mobile station and a base station. In FIG. 5, a number shown in parentheses denotes an order of the sequence. In the present mobile radio communication system having a searching channel which controls an irradiation direction of a narrow beam, all base stations 102 use a forward tracking channel as shown in the prior art varying a depression angle $\phi$ and a bearing angle $\theta$ as shown in (2) of FIG. 5 and irradiates a transmitting narrow beam omni-directionally (step S0001). Next, as shown in (3) of FIG. 5, all base stations 102 transmit a base station identifier (hereinafter referred to as base station ID) to identify each base station (step S0002).

The mobile station 101 waits for a tracking channel beam including the base station ID from a visiting area base station 102 as shown in (1) of FIG. 5 by varying the beam receiving direction of its antenna as shown in FIG. 2 (steps S0101, S0102). In a receiver of the mobile station 101 (not shown), a conventional omnidirectional receiving may be possible according to parameters.

The mobile station 101 obtains a visiting area base station ID by receiving a forward tracking channel beam from the visiting area base station 102 (step S0103), and determines the transmitting direction shown in (4) of FIG. 5 as well as the prior art. As shown in (5) of FIG. 5, the mobile station 101 transmits a mobile station identifier (hereinafter referred to as mobile station ID) which identifies the mobile station 101 in the receiving direction and a visiting area base station ID in a reverse tracking channel (step S0105).

Further, the mobile station 101 transmits an end signal of a reverse tracking channel as shown in (11) of FIG. 5 (step S0106), then uses a frequency and beam direction of a reverse tracking channel as shown in (12) of FIG. 5, and transmits by switching a tracking channel to an information channel (step S0107). The base station 102 similarly uses the frequency and beam direction of the forward tracking channel in switching to an information channel.

According to the embodiment 1 described above, after both tracking between the mobile station 101 and the visiting area base station 102 has completed, switching to an information channel is performed using the same frequency and beam which are used by a tracking channel, thereby an operation switching a tracking channel to an information channel by another frequency and beam is not needed. Thus, a configuration of a device becomes more simple than a conventional system.

Further, according to the embodiment 1, the visiting area base station 102 varies a transmitting direction of a beam and the mobile station 101 varies the receiving direction, so a receiving side may receive a beam transmitted from the visiting area base station 102 more precisely. Thus, a receiving level of a narrow beam in the mobile station 101 becomes more strong, thereby interference from the adjacent base station 102 may be reduced in an area which a plurality of base stations overlap.

EMBODIMENT 2

On the other hand, when the visiting area base station 102 receives a reverse tracking channel from the mobile station 101, the visiting area base station 102 obtains the mobile station ID (step S0004), and then determines a transmitting direction of a beam by the same conventional method as shown in (6) of FIG. 5 and halts the irradiation operation of the narrow beam for searching (step S0005) and irradiates a narrow beam showing an end signal of a forward tracking channel by the forward tracking channel to the receiving direction as shown in (7) of FIG. 5 (step S0006).

Further, the visiting area base station 102 uses a frequency and a beam of a tracking channel without changing as shown in (8) of FIG. 5 to transmit an information channel (step S0007) and waits a receiving of an end signal of a reverse tracking channel from the mobile station 101 at the same time.

When the mobile station 101 receives an end signal of a forward tracking channel from the visiting area base station 102, it starts a receiving of a forward information channel and becomes a communication state as shown in (10) of FIG. 5.

When the visiting area station 102 receives an end signal of a reverse tracking channel from the mobile station 101, it transmits a reverse information channel of (13) of FIG. 5. Thereby, a bidirectional communication between the visiting area base station 102 and the mobile station 101 becomes possible.

Figure 6A:
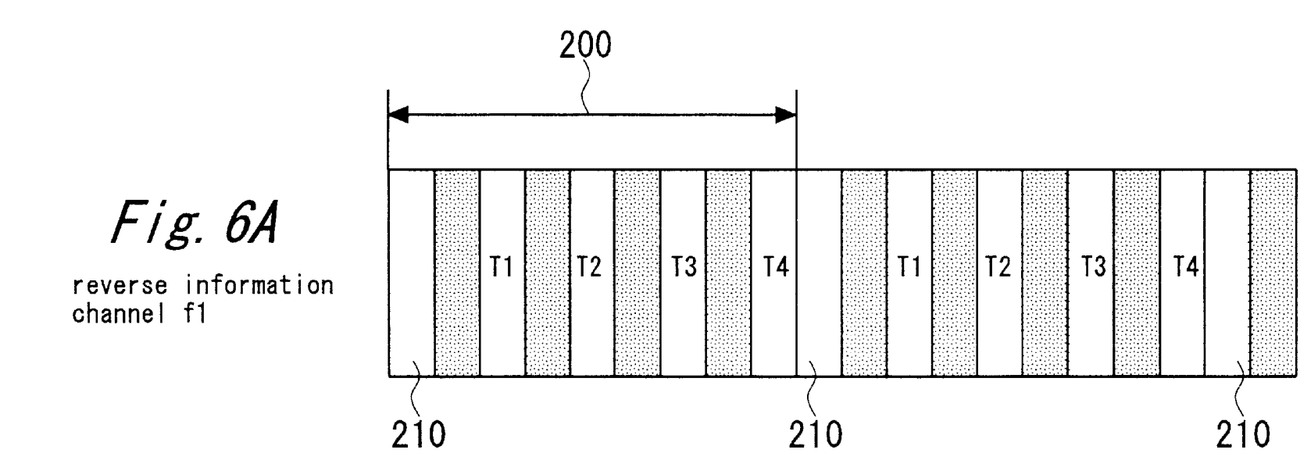
FIGS. 6A and 6B are configuration diagrams of tracking slots and control slots in information channels.
Figure 6B:
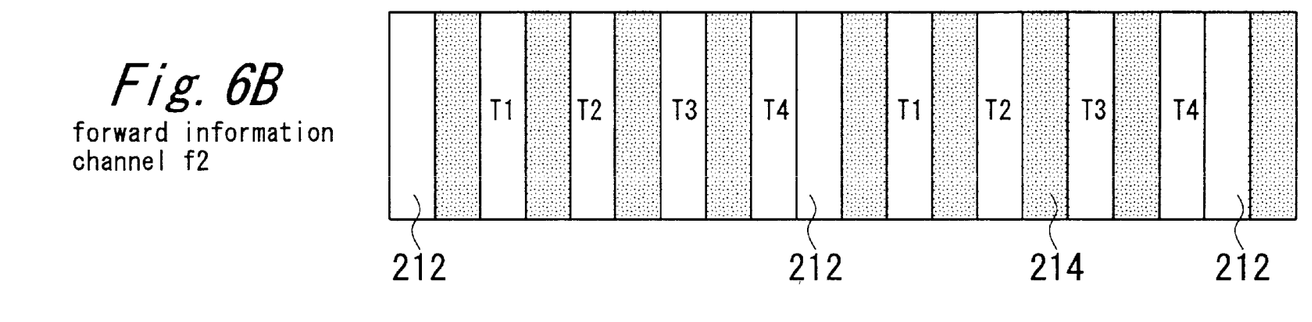

An information of a bearing angle and a receiving level is measured in any time in communication. FIGS. 6A and 6B show configurations of a tracking slot and a control slot in reverse information channel f1 and a forward information channel f2. As shown in FIGS. 6A and 6B, a channel is made from some frames 200 or the like, and each frame has a searching slot 210 or the like and followed by some control slots 214 or the like which transmit and receive a control signal. The information of the bearing angle and the receiving level is transmitted from the base station 101 to the visiting area base station 102 using a control slot which transmits and receives a control signal shown in FIGS. 6A and 6B. The visiting area base station 102 determines an irradiation direction of a narrow beam based on the information and adjusts a control.

According to the embodiment 2 described above, after both tracking between the mobile station 101 and the visiting area base station 102 has completed, switching to an information channel is performed using the same frequency and beam which are used by a tracking channel, thereby an operation switching a tracking channel to an information channel by another frequency and beam is not needed. Thus, a configuration of a device becomes more simple than a conventional system.

EMBODIMENT 3

In the embodiment 3, a case which the mobile station 101 becomes to a communication state with the visiting area station 102 will be explained. As shown in FIGS. 6A and 6B, an information channel between the mobile station 101 and the visiting area station 102 is constituted by a plurality of frame 200 or the like. Further, control slots 214 or the like for controlling the mobile station 101 and the base station 102, tracking slots for searching the adjacent base station 102 (hereinafter referred to as searching slot) 210 or the like and information slots for transmitting information are provided in the frame 200 or the like.

Figure 7:
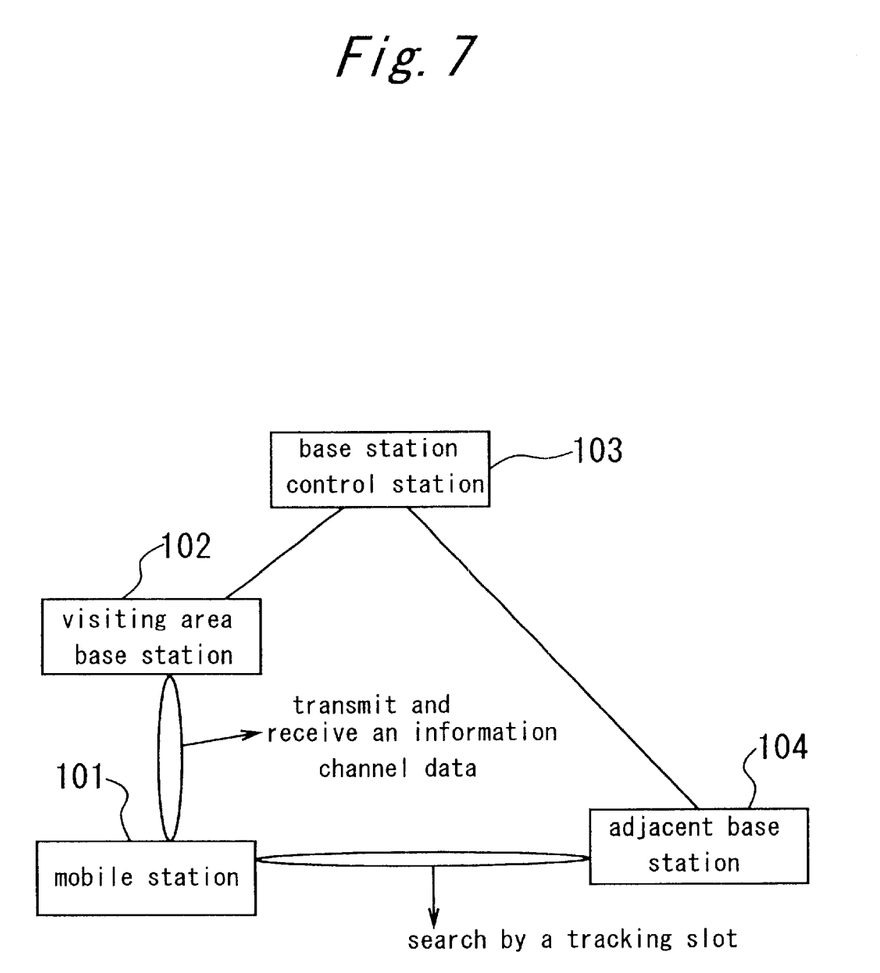
FIG. 7 is an illustrative diagram of an information channel in communicating between a mobile station and a visiting area base station, and a searching method by a tracking slot between the mobile station and an adjacent base station.

As shown in FIG. 7, while the mobile station 101 communicates with the visiting area station 102, a searching is performed between the mobile station 101 and the adjacent base station 102 by controlling a receiving direction of a narrow beam at intervals of the above searching time slots as well as the embodiment 1, and a communication of both searching channel is kept by the same procedure as the setting method of the information channel in the embodiment 2.

According to the embodiment 3 described above, as the mobile station 101 can search the adjacent base station 102 although the visiting base station 102 and the mobile station 101 are communicating each other in an overlapped area, thereby a searching time can be reduced.

EMBODIMENT 4

Figure 8:
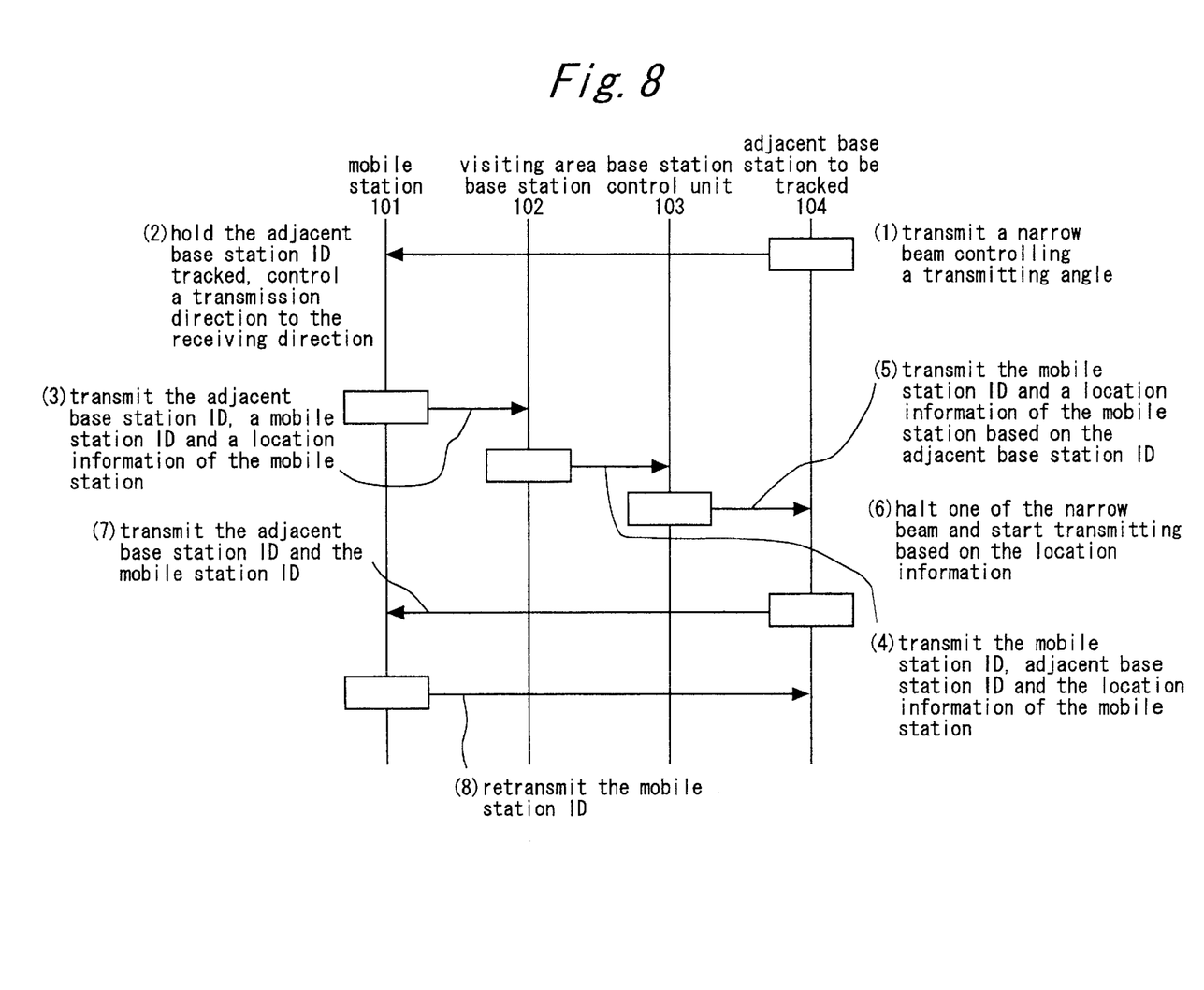
FIG. 8 is a sequence diagram showing a sequence of tracking an adjacent base station being searched.

FIG. 8 is a sequence diagram showing a sequence of tracking an adjacent base station being searched. As shown in (1) of FIG. 8, adjacent base station 104 transmits a narrow beam controlling a transmitting angle. As shown in (2) of FIG. 8, when the mobile station 101 receives a forward searching slot from the adjacent base station 104 and the mobile station 101 obtains the adjacent base station ID, the mobile station 101 holds the adjacent base station ID and a receiving direction of the ID. At the same time, as shown in (3) of FIG. 8, the mobile station 101 transmits the adjacent base station ID, the receiving direction and a receiving level information and a control information of an information channel in the mobile station 101 to the visiting area base station 102 in communicating by a control slot on the information channel.

Next, as shown in (4) of FIG. 8, after the visiting area base station 102 in communicating receives the above information from the mobile station 101, it transmits the information to the base station control unit 103. The base station control unit 103 receives the information from the visiting area base station 102 and obtains the adjacent base station ID, then as shown in (5) of FIG. 8, it transmits a beam receiving direction, a receiving level and a control information of an information channel in the mobile station 101 to the adjacent base station 104 designated by the adjacent base station ID. Thereby, the adjacent base station 104 can obtain the information, resulting in the both tracking of the mobile station 101 and the adjacent base station 104 without the tracking channel. Thus, a new tracking processing shown in (1)–(5) of FIG. 5 between the adjacent base station 104 and the mobile station 101 is not necessary, thereby a tracking time can be reduced. As a switching to another frequency is not necessary, a device configuration becomes simple.

According to the embodiment 4 described above, as the mobile station 101 does not transmit a reverse tracking channel to the adjacent base station 104 and can transmit a location information using an information channel in communication via the visiting area base station 102, a tracking time between selecting (adjacent) base station 104 and the mobile station 101 can be reduced, and a device configuration becomes simple.

EMBODIMENT 5

As shown in (6) of FIG. 8, the adjacent base station 104 which is received a location information of the mobile station 101 from the base station control unit 103 halts one of irradiation operation of narrow beams irradiated for searching the mobile station 101, and as shown in (7) of FIG. 8, transmits a beam based on the adjacent base station ID, the mobile station ID received from the base station control unit 103 and a control signal to the direction of the location of the mobile station 101 designated newly by the base station control unit 103. A correction of the direction is performed by controlling transmitting direction according to the information of receiving direction as well as the embodiment 4.

After the mobile station 101 receives the above information from the adjacent base station 104, it confirms the adjacent base station ID and the mobile station ID by a searching slot and then transmits the mobile station ID gain as shown in (8) of FIG. 8. Thereby, the mobile station 101 can track the adjacent base station 102 in any time.

Figure 9:
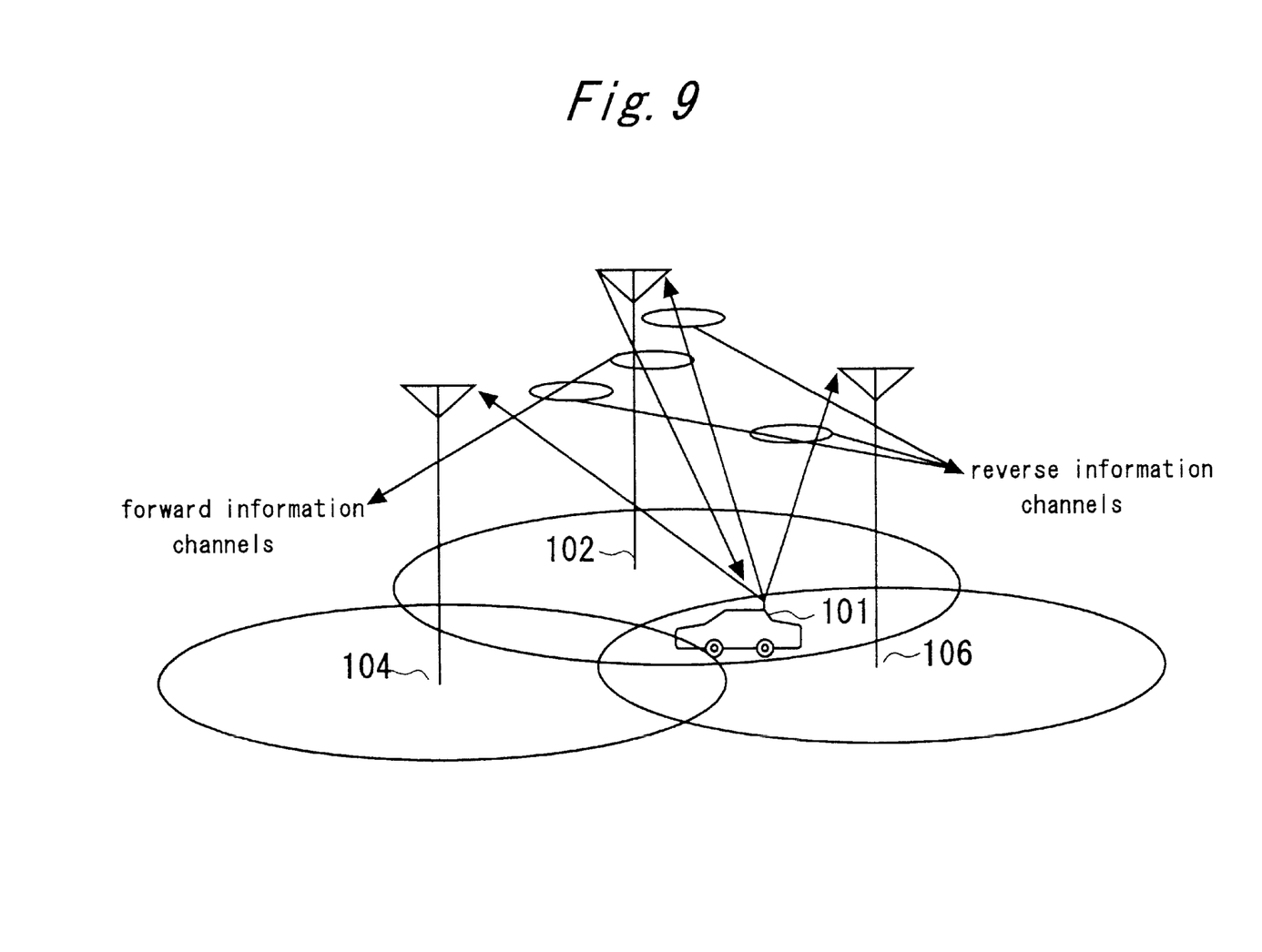
FIG. 9 is an example of configuration diagram of an information channel between a mobile station and a plurality of a base station at the time of handover.

When a receiving level of a beam from the visiting area base station 104 is less than a threshold value, the mobile station 101 transmits an end signal of a searching channel to the adjacent base station 104 using the above searching slot, and then communicates with the adjacent base station 104 by switching the searching channel to an information channel. As shown in FIG. 9, by switching a plurality of information channels between the mobile station 101 and a plurality of the base stations 102 or the like in any time, the mobile station 101 can communicates with these base stations 102 or the like successively.

Figure 10:
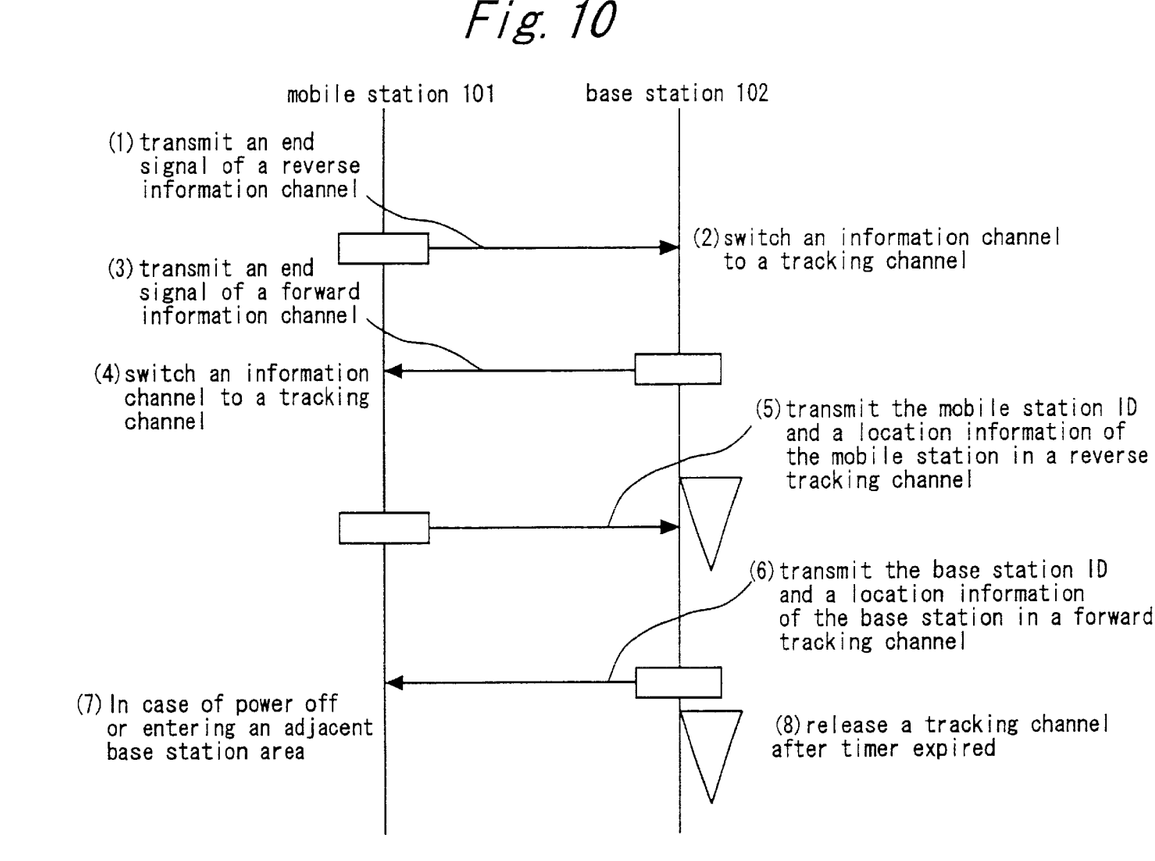
FIG. 10 is a sequence diagram showing an alteration sequence from a communicating state to a tracking state, and a sequence at the time of power off or entering an adjacent base station area.

As shown in (1) of FIG.10, when the mobile station 101 stops communication, it transmits an end signal of transmitting using a control slot in an information channel to the visiting area base station 102 and switches a communication channel to a tracking channel.

As shown in (2) of FIG. 10, after the visiting area base station 102 receives an end signal of communication from the mobile station 101, it switches a froward communication channel to a tracking channel. At the same time, it transmits an end signal of a forward information channel using a forward information channel as shown in (3) of FIG. 10.

As shown in (4) of FIG. 10, after the mobile station 101 receives an end signal of a forward information channel from the visiting area base station 102, it switches a forward information channel to a tracking channel. After that, when the mobile station 101 is in the visiting area, the mobile station 101 transmits the mobile station ID and its location information to the visiting area station 102 as shown in (5) of FIG. 10 and performs transmitting control of the visiting area base station 102. At the same time, it performs transmitting control of the mobile station 101 by transmitting the base station ID to the mobile station 101 in a forward tracking channel.

As shown in (7) of FIG. 10, when the mobile station 101 turns off the power or enters an area of other adjacent base station, it becomes difficult for the visiting area base station to communicate or track the mobile station 101 because the visiting area base station 102 can not detect such situation. Therefore, a timer is set in the visiting area station 102, thereby the timer is invoked using a receiving of a location information as a trigger when the visiting area base station 102 receives the location information of the mobile station 101 from the mobile station 101. As shown in (8) of FIG. 10, the tracking channel is released compulsively after the timer expired, and the other mobile station 101 is searched using the released tracking channel.

Thus, processing can proceed when the mobile station 101 turns off the power or enters an area of other adjacent base station 102.

According to the embodiment 5 described above, as a timer is set in the visiting area station 102 and the timer is invoked using a receiving of a location information as a trigger from the mobile station 101 and the tracking channel is released compulsively after the timer expired and the other mobile station 101 is searched using the released tracking channel, thereby processing can proceed when the mobile station 101 turns off the power or enters an area of other adjacent base station 102.

According to the present invention, the visiting area base station 102 varies a transmitting direction of a beam as well as the mobile station 101 varies the receiving direction, so a receiving side may receive a beam transmitted from the visiting area base station 102 more precisely. Thus, a receiving level of a narrow beam in the mobile station 101 becomes more strong, thereby a interference from the adjacent base station 102 may be reduced in an area which a plurality of a base station overlap.

According to the present invention, after both tracking between the mobile station 101 and the visiting area base station 102 has completed, switching to an information channel is performed using the same frequency and beam which are used by a tracking channel, thereby an operation switching a tracking channel to an information channel by another frequency and beam is not needed. Thus, a configuration of a device becomes more simple than a conventional system.

According to the present invention, as the mobile station 101 can search the adjacent base station 102 although the visiting base station 102 and the mobile station 101 are communicating each other by having a searching slot in an information channel, thereby a searching time can be reduced. The searching slot is provided for searching an adjacent base station adjacent to the visiting area base station, and the searching slot is provided in an information channel being used in communication between the mobile station and the visiting area station. The present invention further comprises a means for searching the adjacent base station by the mobile station using the searching slot in the information channel and a means for transmitting a narrow beam by the adjacent base station.

According to the present invention, as the mobile station 101 does not transmit a reverse tracking channel to the adjacent base station 104 and can transmit a location information using an information channel in communication via the visiting area base station 102, a tracking time between selecting (adjacent) base station 104 and the mobile station 101 can be reduced, and a device configuration becomes simple.

According to the present invention, as a timer is set in the visiting area station 102 and the timer is invoked using a receiving of a location information as a trigger from the mobile station 101 and the tracking channel is released compulsively after the timer expired and the other mobile station 101 is searched using the released tracking channel, thereby processing can proceed when the mobile station 101 turns off the power or enters an area of other adjacent base station 102.

The present invention has been described in detail with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

The entire disclosure of Japanese Patent Application No. 10-239721 filed on Aug. 26, 1998 including specification, claims, drawings and summary are incorporated herein by reference in its entirety.

What is claimed is:

1. A mobile communication system, comprising:

a mobile station;

at least one base station covering an area into which said mobile station enters;

said at least one base station having a controller for transmitting a narrow forward tracking beam in a tracking channel at a certain frequency and for varying the direction of said forward tracking beam;

said mobile station having a controller for varying the direction of reception for receiving said forward tracking beam, for transmitting a narrow reverse tracking beam in said tracking channel and for varying the direction of said reverse tracking beam;

wherein upon completion of a tracking process in which said mobile station and said at least one base station track each other's position relative to each other using said narrow tracking beams, said mobile station and said at least one base station switch to an information channel using the same frequency and direction as said tracking channel.

2. A mobile communication system as set forth in claim 1, further comprising:

an adjacent base station covering an area adjacent to the area covered by said at least one base station, including a controller for transmitting a narrow forward tracking beam; wherein said mobile station is adapted to track said adjacent base station by receiving said narrow forward tracking beam of said adjacent base station during communication with said at least one base station.

3. A mobile communication system as set forth in claim 2, wherein a searching slot is provided in said information channel used by said at least one base station and said mobile station, and wherein said mobile station searches for said adjacent base station using said searching slot during communication with said at least one base station.

4. A mobile communication system, comprising:

a mobile station;

at least one base station covering an area into which said mobile station enters;

an adjacent base station covering an area adjacent to the area covered by said at least one base station;

said at least one base station and said adjacent base station having a controller for transmitting a narrow forward tracking beam in a tracking channel at a certain frequency and for varying the direction of said forward tracking beam;

said mobile station having a controller for varying the direction of reception for receiving the forward tracking beam from each of said base station, for transmitting to said at least one base station a narrow reverse tracking beam in said tracking channel and for varying the direction of said reverse tracking beam;

wherein during communication between said at least one base station and said mobile station over an information channel, said mobile station receives over a tracking channel in a searching slot of said information channel a base station identifier transmitted by said adjacent base station, and said mobile station transmits to said at least one base station control information including position information of said mobile station, a mobile station identifier, and said base station identifier of said adjacent base station, and said at least one base station transmits said control information to said adjacent base station through said controller.

5. A mobile communication system as set forth in claim 4, wherein said at least one base station includes a timer which starts counting down a predefined period of time upon receipt by said at least one base station of said position information from said mobile station, and said at least one base station releases said tracking channel upon expiration of said predefined period of time as determined by said timer and uses the released tracking channel to search for other mobile stations within said covered area.

* * * * *